US009171452B2

(12) United States Patent
Onsori

(10) Patent No.: US 9,171,452 B2
(45) Date of Patent: Oct. 27, 2015

(54) AC INDUCTION NOISE CANCELER

(71) Applicant: Tyco Safety Products Canada Ltd., Concord (CA)

(72) Inventor: Reza Onsori, Toronto (CA)

(73) Assignee: TYCO SAFETY PRODUCTS CANADA LTD., Concord, Ontario (CA)

( * ) Notice: Subject to any disclaimer, the term of this patent is extended or adjusted under 35 U.S.C. 154(b) by 305 days.

(21) Appl. No.: 13/749,147

(22) Filed: Jan. 24, 2013

(65) Prior Publication Data

US 2014/0203867 A1 Jul. 24, 2014

(51) Int. Cl.
*G06F 17/10* (2006.01)
*G08B 29/18* (2006.01)

(52) U.S. Cl.
CPC .................................... *G08B 29/185* (2013.01)

(58) Field of Classification Search
None
See application file for complete search history.

(56) References Cited

U.S. PATENT DOCUMENTS

2011/0181422 A1 7/2011 Tran
2011/0270491 A1* 11/2011 Kincaid et al. .................. 701/45

FOREIGN PATENT DOCUMENTS

CA 1 161 766 2/1984

OTHER PUBLICATIONS

Vinger, et al., "Implementing Evolution of FIR-Filters Efficiently in an FPGA", IEEE Proceedings of the 2003 NASA/DOD Conference on Evolvable Hardware, (con'd below).
ISBN 0-7695-1977-6/03, 2003, Section 2.2; and Fig. 1.
Patent Cooperation Treaty, International Search Report, mailed Feb. 21, 2014, for International Application No. PCT/CA2013/050949.

* cited by examiner

*Primary Examiner* — Michael D Yaary
(74) *Attorney, Agent, or Firm* — Kacvinsky Daisak Bluni PLLC

(57) ABSTRACT

A method for removing noise from an electrical signal in an alarm system using a software filter, the method including the steps of converting the electrical signal from an analog signal into a digital signal, wherein the digital signal includes a series of sampled values, entering a most recent of the sampled values into a circular index containing a number of previously sampled values, multiplying each of the values in the circular index by a predetermined filter coefficient, and summing products of each of the multiplied circular index values and filter coefficients to arrive at a filtered digital signal value.

14 Claims, 3 Drawing Sheets

AC INDUCTION NOISE CANCELER

FIELD OF THE DISCLOSURE

The disclosure relates generally to the field of alarm systems, and more particularly to a software filter for filtering electrical signal noise in an alarm system.

BACKGROUND OF THE DISCLOSURE

Alarm systems, such as burglar and fire alarm systems, typically include one or more centralized control panels that receive information from various sensors distributed throughout a structure, building, area, house, etc. For example, a typical household burglar alarm system may include a plurality of magnetic contacts, motion sensors, and vibration sensors that are grouped into independently-monitored detection circuits connected to a control panel. Each detection circuit may be installed in a designated area or "zone" within a building. During normal operation of the alarm system, the control panel may monitor a voltage signal in each detection circuit for variations that may represent the occurrence of a particular alarm condition within a zone. For example, an elevated voltage signal in a particular detection circuit may represent the detection of a broken window by a vibration sensor in a corresponding zone of the house, and may cause the control panel to enter an alarm mode. Since the physical location of each zone of an alarm system is known, homeowners and response personal are readily apprised of the area of the house in which the alarm condition originated.

Like many other electrical systems, alarm systems are sensitive to various types of electromagnetic interference or "noise." Noise refers to the unintentional or unwanted introduction of energy of a specific frequency, or range of frequencies, into an electrical signal. A predominant cause of electrical signal noise in alarm systems is so-called "line frequency noise." Line frequency noise (and noise stemming from its harmonic frequencies, which occur at integer multiples of the underlying line frequency) in alarm systems is a byproduct of the near ubiquitous presence of generated electricity and devices powered by electricity located near various components of an alarm system. In the United States, for example, electrical power is distributed in the form of an alternating current (AC) that cycles at 60 Hz, which can produce noise at 60 Hz and at harmonics thereof. Such noise is commonly referred to as "AC induction noise."

Because electrical noise can introduce unwanted components into an electrical transmission signal, it can create significant problems in the context of alarm systems where various sensors communicate with a control panel. For example, line noise may interfere with voltage signals associated with detection circuits. Thus, unless the part of a signal that is attributable to noise is filtered out, a control panel of an alarm system may incorrectly interpret the operational state of a zone in the system. For example, the presence of noise in a detection circuit may cause a control panel to record an alarm condition in a particular zone when no such condition exits, creating a so-called "false alarm." In another example, the presence of noise could cause a control panel to erroneously record a fault condition, such as may be indicative of a system malfunction, when an alarm condition actually exits. Such inaccurate reporting runs counter to the fundamental requirements of most alarm systems, which dictate that an alarm system should not false alarm and should operate as intended when subjected to an alternating current induced on any signal lead, sensing lead, loop, DC power lead, or any other lead that extends throughout the wiring of a monitored premises.

In certain alarm systems, hardware signal filters are used to remove unwanted electrical noise from monitored voltage signals. For example, conventional notch filters are commonly employed in alarm systems to attenuate signal frequencies at or near 60 Hz which are known to be associated with AC induction noise. These frequencies are thereby ignored by a control panel and are prevented from affecting proper operation of the alarm system. Although hardware signal filters can be effective for improving the robustness of alarm systems to the extent they filter out AC induction noise, they have several shortcomings and disadvantages. For example, the additional circuit components necessary for implementing hardware signal filters can significantly increase the cost of an alarm system. Since each detection circuit in an alarm system must generally be associated with a separate hardware signal filter, the cost of implementing filters in systems having a large number of zones can be substantial.

Another shortcoming associated with hardware signal filters is that they can be slow to respond to the introduction of signal noise. For example, a typical control panel will record an alarm condition in a zone if a voltage signal representative of such a condition persists in the detection circuit of the zone for longer than a predetermined "loop response time," usually ranging from of about 30 milliseconds to about 2.5 seconds. In the case of so-called "fast loop response zones," which typically have response times of about 30 milliseconds, an alarm condition induced by signal noise may be recorded by a control panel before a conventional hardware filter is able to remove the unwanted signal frequencies, thus causing a false alarm. Additional circuit components can be added to alarm system circuitry to improve the speed with which hardware filters are able to counteract noise, but such components further increase the complexity and cost of typical alarm systems. A further disadvantage associated with hardware signal filters in alarm systems is that such filters are generally difficult to install and, once installed, are difficult to modify. For example, disabling or altering the operational characteristics of a hardware filter generally requires the physical alteration of alarm system circuitry, necessitating trained personal as well as significant additional time and expense.

In view of the foregoing, it would be advantageous to provide an alarm system having noise filtering means, and particularly AC induction noise filtering means, that are inexpensive, fast-responding, and that can be easily implemented.

SUMMARY

In accordance with the present disclosure, a method and system for removing electrical signal noise in alarm system using a software filter are disclosed. An exemplary embodiment of a filtering method in accordance with the present disclosure can include the steps of converting an analog electrical signal in an alarm system detection circuit into a digital signal, wherein the digital signal includes a series of sampled values, entering a most recent of the sampled values into a circular index containing a number of previously sampled values, multiplying each of the values in the circular index by a predetermined filter coefficient, and summing products of each of the multiplied circular index values and filter coefficients to arrive at a filtered digital signal value.

An embodiment of an alarm system in accordance with the present disclosure can include at least one detection circuit and an analog-to-digital converter (ADC) operatively connected to the detection circuit, wherein the ADC is configured convert an analog electrical signal in the detection circuit into a digital signal. The alarm system may further include a software filter operatively connected to the ADC, wherein the software filter is configured to receive the converted digital signal and to filter noise associated with a predetermined frequency range from the digital signal. The alarm system may further include a central processing unit (CPU) that is operatively connected to the software filter, wherein the CPU is configured to receive the filtered signal and identify an operational state of the detection circuit based on the filtered signal.

BRIEF DESCRIPTION OF THE DRAWINGS

By way of example, specific embodiments of the disclosed device will now be described, with reference to the accompanying drawings, in which.

DETAILED DESCRIPTION

Figure 1:
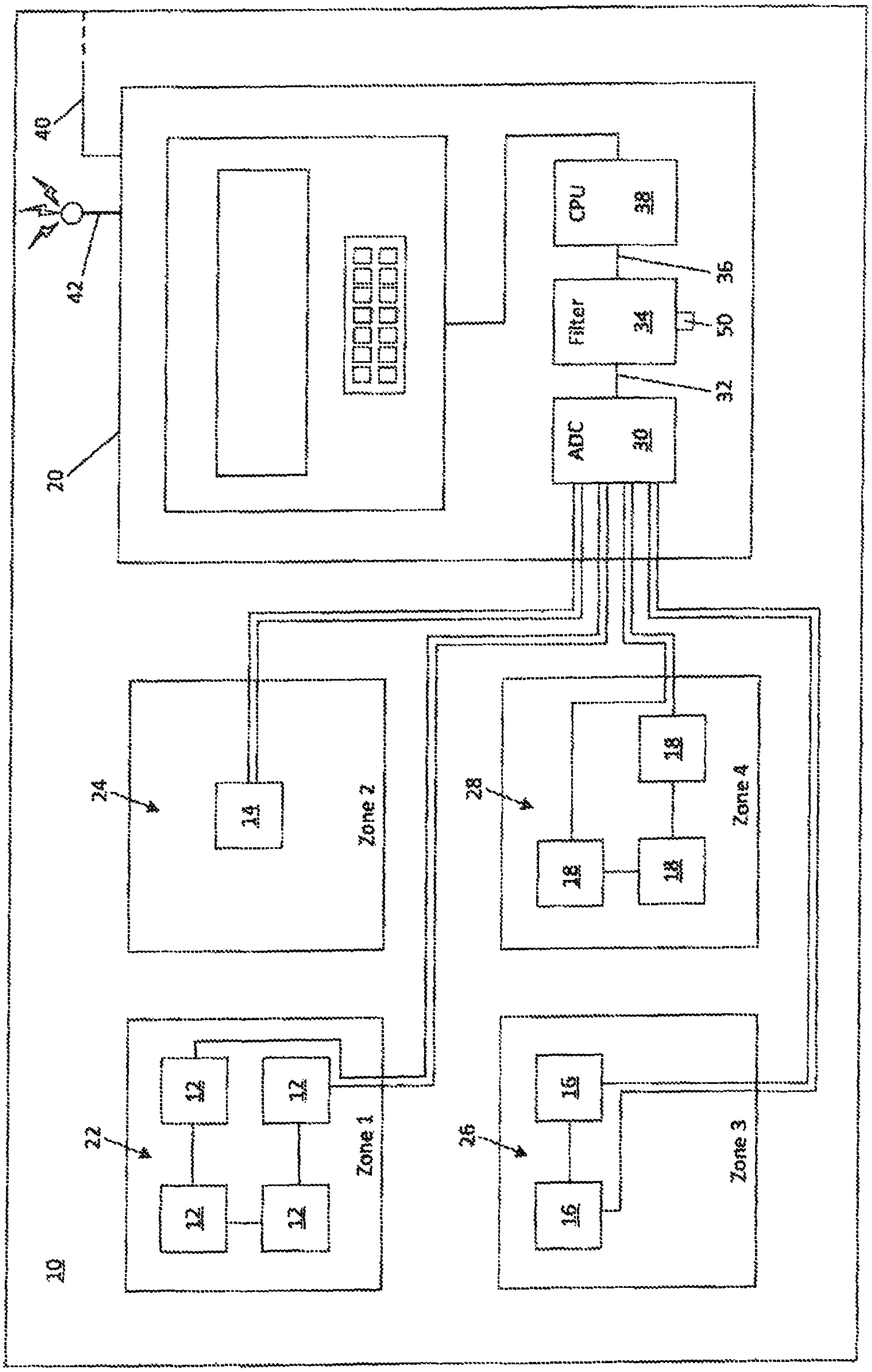
FIG. 1 is a schematic diagram illustrating an alarm system in accordance with an exemplary embodiment of the present disclosure.

A device and method for cancelling AC induction noise in alarm systems in accordance with the present disclosure will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a schematic diagram of an alarm system 10 which may represent virtually any type of alarm system, including, but not limited to, a burglar alarm system, a fire alarm system, an air quality alarm system, etc., or any combination thereof, that is provided for detecting an alarm event (e.g. a security breach or an emergency condition) in a building, structure or area, for example. The alarm system 10 may include a plurality of sensors 12, 14, 16, and 18 that are distributed throughout a structure and are operatively connected to a centralized control panel 20 as further described below. The sensors 12-18 may include, but are not limited to, contact sensors, motion sensors, glass-break sensors, temperature sensors, smoke sensors, carbon monoxide sensors, and panic button sensors, etc. The sensors 12-18 may facilitate the detection of an alarm event based on an electrical signal sent from one or more of the sensors 12-18. For example, when the alarm system 10 is in an armed mode, the alarm system 10 may detect an intruder entering a building in response to receiving a signal from a contact sensor provided on a door to a building.

The sensors 12-18 of the alarm system 10 may be grouped into independently-monitored detection circuits 22, 24, 26, and 28. Each of the detection circuits 22-28 may be installed in a designated area or "zone" within a building. For example, "Zone 1" in FIG. 1 may be a living room in a monitored residence and may include four sensors 12 connected in the detection circuit 22. "Zone 2" in FIG. 1 may be a hallway in the monitored residence and may include one sensor 14 connected in the detection circuit 24. "Zone 3" in FIG. 1 may be a bedroom in the monitored residence and may include three sensors 16 connected in the detection circuit 26. Finally, "Zone 4" in FIG. 1 may be a basement in the monitored residence and may include two sensors 18 connected in the detection circuit 28. Of course, it is contemplated that the alarm system 10 may include a greater or fewer number of zones, detection circuits, and/or sensors than shown in FIG. 1, such as may be dictated by the requirements of a particular building, structure or area being monitored by the alarm system. It will be appreciated by those of ordinary skill in the art that each of the circuits 22-28 may be wired in accordance with any detection circuit loop configuration that is appropriate for a particular application, including, but not limited to, normally open (NO), normally closed (NC), single end of line (SEOL), double end of line (DEOL), and triple end of line (TEOL).

Each of the detection circuits 22-28 may be electrically connected to an analog-to-digital convertor (ADC) 30 that may be located within the control panel 20 of alarm system 10. The ADC 30 may be configured to convert analog voltage output signals in each of the detection circuits 22-28 into corresponding digital signals. For example, the output signal in a particular detection circuit may have a time-varying amplitude in a range of 0V to 3.3V. The exact amplitude range for a given detection circuit will generally depend on the particular configuration of the circuit. The ADC 30 converts the amplitude of the analog output signal in a detection circuit into a series of discrete integers within in a predefined range, such as 0 to 4095 (i.e. 12-bit values), wherein each integer corresponds to a particular analog output voltage amplitude at a given time. The specific range of discrete integers will of course depend on the resolution of the particular type of ADC employed. The ADC 30 may perform the signal conversion at a predefined sampling rate, such as 125 Hz, for example. The ADC 30 may thus generate digital voltage signals representing contemporaneous analog voltage signals in each of the detection circuits 22-28, and may provide such converted digital signals as data output via output line 32.

The alarm system 10 may further include a filter 34, which may also be located within the control panel 20 and which may receive, as input, the converted digital output voltage signal data provided by the ADC 30 via output line 32. The filter 34 is configured to remove unwanted signal noise, such as AC induction noise that may be produced in the detection circuits 22-28, from the output voltage signals as described in greater detail below. The filter 34 may include a processor, such as, for example, an application specific integrated circuit (ASIC), field-programmable gate array (FPGA), digital signal processor (DSP), microcontroller unit (MCU), or other computing device capable of receiving digital signals and performing software operations on such data as further described below. The filter 34 thus receives unfiltered digital voltage signal data from the ADC 30 and provides, as output, filtered digital voltage signal data on output line 36.

The alarm system 10 may further include a CPU 38, which may also be located within the control panel 20 and which may receive, as input, the filtered digital voltage signal data provided by filter 34 via output line 36. Similar to the filter 34, CPU 38 may include a processor, such as, for example, an ASIC, FPGA, DSP, MCU, or other computing device capable of receiving digital signal data and executing software instructions. Particularly, the CPU 38 may be programmed to determine, based on the digital signal input, the operational state of each of the detection circuits 22-28 of the alarm system 10. For example, in a detection circuit having a DEOL configuration, the CPU 38 may be programmed to interpret a digital signal value between 1028 and 2396 (which may represent an analog signal range of about 0.825V to about 1.65V, for example) as being representative of a normal operating condition. The CPU 38 may further be programmed to interpret a signal value below 1028 (which may represent an analog signal range of below about 0.825V, for example) in the same circuit as being representative of a fault condition, such as may arise if there is a short in the detection circuit. The CPU 38 may further be programmed to interpret a signal value between 2397 and 3141 (which may represent an analog signal range of about 1.65V to about 2.475V, for example) in the same circuit as being representative of an alarm condition, such as may arise if a sensor in the detection circuit is tripped. Finally, CPU 38 may be programmed to interpret a signal value of above 3141 (which may represent an analog signal range of above about 2.475V, for example) in the same circuit as being representative of a tamper condition, such as may arise if the detection circuit is cut or otherwise disabled.

In the event that the CPU 38 identifies an abnormal signal value (i.e. a value indicative of a fault, alarm, or tamper condition in a detection circuit), the CPU 38 may be programmed to initiate certain predefined actions. For example, if an alarm condition is identified in one or more of the detection circuits 22-28 and such condition persists for longer than a response time of the circuit(s), the CPU 38 may be programmed to activate notification appliances, such as strobes or horns, located within the monitored structure. Furthermore, CPU 38 may be programmed to contact, such as via wired 40 or wireless 42 communication means (e.g. telephone line, Ethernet, WiFi, etc.), a security service provider to alert the provider of the detected alarm condition. The provider may then issue personnel to the monitored structure or may contact, for example, police and/or fire departments to address the condition. Still further, CPU 38 may be programmed to issue notification messages, such as via wired 40 or wireless 42 communication means, to property owners or personnel responsible for management or oversight of the monitored structure. It will be appreciated by those of ordinary skill in the art that CPU 38 may be programmed to initiate many other actions in response to various other alarm conditions that are not explicitly described herein without departing from the scope of the present disclosure. Such actions and conditions will generally depend on the specific type of alarm system 10 that is in use. For example, in the case of an air quality alarm system, the CPU 38 may be programmed to activate or disable one or more blowers in a heating, ventilation and air-conditioning (HVAC) system upon receiving signal data indicative of poor air quality in a particular zone of the alarm system 10.

In view of the forgoing, the importance of removing unwanted signal noise (e.g. AC induction noise) from the sampled detection circuit voltage signals more quickly than the response times of the detection circuits 22-28 is readily apparent. Particularly, such noise could cause a voltage signal that would otherwise be accurately identified as indicating a particular operational state of a detection circuit 22-28 to be distorted and to resultantly be inaccurately identified as indicating a different operational state. For example, in a DEOL detection circuit, the voltage signal amplitude may, in the absence of signal noise, be in a range of about 0.825V to about 1.65V, giving rise to a converted digital signal value in a range of 1028 to 2396 that is indicative of a normal operating condition. If, however, the detection circuit is subjected to AC induction noise, such as may be produced by an electrical conductor or device in the vicinity of the detection circuit, the amplitude of the voltage signal in the detection circuit may be caused to exceed 1.65V, giving rise to a converted digital signal value above 2396. If the noise is not removed from the signal more quickly than the response time of the circuit, CPU 38 may identify the distorted signal as being indicative of a fault, alarm, or tamper condition. Such identification may cause the CPU 38 to initiate numerous actions that are inapposite with respect to the actual operational state of the detection circuit, which may result in the unnecessary deployment of personnel and resources and may subject individuals to inconvenience or even the risk of physical harm.

Although the ADC 30, filter 34, and CPU 38 of the alarm system 10 are shown in FIG. 1 as separate components within the control panel 20, it is contemplated that any or all of the ADC 30, filter 34, and CPU 38 may be integral components of a single module, device, or circuit. For example, it is contemplated that the filter 34 and the CPU 38 may include, or may be embodied by, a single, common processor in the control panel that executes software instructions in accordance with the forgoing and following descriptions of the filter 34 and the CPU 38. It is further contemplated that any or all of the ADC 30, filter 34, and CPU 38, whether implemented as separate components or as integral components of a single module, device, or circuit, may be located within or without the control panel 20. For example, the filter 30 may be an independent module that may be located remote from the control panel 20, such as in different rooms of the same building or in different buildings that are located remote from one other, and may be operatively connected to the ADC 30 and CPU 38 within the control panel 20 by wired 40 or wireless 42 data communication means. All such variations in the configuration of the alarm system 10 may be employed without departing from the scope of the present disclosure.

Filter Operation

As briefly described above, filter 34 of the alarm system 10 is provided for removing certain signal components that are attributable to line noise, and particularly AC induction noise, from a digital output voltage signal. The functionality of the filter 34 is effectuated by a processor that is programmed to execute a series of software instructions (i.e. an algorithm) as further described below. The filter 34 may therefore be more specifically referred to as a "software filter." Referring to FIG. 2, a flow diagram is provided that, in conjunction with the following description and the schematic representation of the alarm system 10 provided in FIG. 1, illustrates typical operation of the alarm system 10 and operation of the filter 34 in particular.

At a first step 100 in the flow diagram, analog voltage output signals in each of the detection circuits 22-28 may be received by the ADC 30. As described above, the ADC 30 may convert each of the analog output signals into a corresponding series of discrete integers (i.e. digital data), such as 12-bit integers in a range of 0 to 4095, at step 110. The converted digital data may then be outputted by the ADC 30 via data output line 32 at step 120.

At step 130 in the flow diagram, the digital output data produced by the ADC 30 is received as input by the filter 34 via the data output line 32. At step 140, the filter 30 executes a filtering algorithm, whereby a series of software operations are performed on the received digital signal data to generate a stream of filtered signal data. Particularly, the received signal data are modified in a manner that effectively removes amplitude variations that may have been produced by line noise having frequencies in a predefined frequency range (e.g. a frequency range known to be associated with AC induction noise) in one or more of the detection circuits 22-28 of the alarm system, for example. The filtering algorithm may be modeled after a finite impulse response (FIR) filter having an output that is a weighted sum of the current and a finite number of previous values of the input data. Generally, an FIR filter is a filter whose impulse response is of finite duration where the impulse response of an N-length discrete time FIR filer lasts for a duration of N+1 samples and thereafter settles to zero.

The operation performed by the filtering algorithm may therefore be described by the following equation:

$$y[n] = b_0x[n] + b_1x[n-1] + \ldots + b_Nx[n-N]$$

$$y[n] = \sum_{i=0}^{N} b_i x[n-i]$$

where x[n] is the input signal, y[n] is the output signal, $b_i$ are the filter coefficients, also known as "tap weights," that make up the impulse response, and N is the filter length, wherein an N length filter has N terms on the right-hand side. The x[n−i] in these terms are commonly referred to as "taps," based on the structure of a tapped delay line that provides delayed inputs to the multiplication operations.

The filter coefficients $b_i$ (the total number of which is defined by the order of the filter) may be determined by the following coefficient formula:

$$b_i = \begin{cases} \dfrac{\sin[(i-\tau)\Omega_c]}{(i-\tau)\pi}, & \text{for } i \neq \tau \\ \Omega_c/\pi, & \text{for } i = \tau \end{cases}$$

$$i = 0, 1, \ldots, 2M$$

where $b_i$ are the filter coefficients, τ is the number of taps (i.e. (N−1)/2), M is equal to τ if the filter coefficients are symmetric, and $\Omega_c=(\omega_{stop}+\omega_{pass})/(2\times f_s)$, where $\omega_{stop}$ is the stopband lower frequency, $\omega_{pass}$ is the passband upper frequency, and $f_s$ is the sampling frequency. For example, the filter coefficients for an 11-length, 11-tap filter with a sampling frequency $f_s$ of 125 Hz, a passband upper frequency $\omega_{pass}$ of 30 Hz, and a stopband lower frequency $\omega_{stop}$ of 55 Hz (such as may be used to define a range of frequencies associated with AC induction noise) may be calculated as:

h(0)=h(10)=−0.06045
h(1)=h(9)=0.06016
h(2)=h(8)=0.0129
h(3)=h(7)=−0.14391
h(4)=h(6)=0.2611
h(5)=0.6799

It will be appreciated that these coefficient values are provided by way of example only, and that the coefficients for a particular application will depend on the various parameters (e.g. sampling rate, stopband lower frequency, passband upper frequency, etc.) of that application as described above. For example, it is contemplated that the stopband lower frequency may be a value in a range of 40 Hz-60 Hz for cancelling AC induction noise having frequencies above such value.

Figure 2:
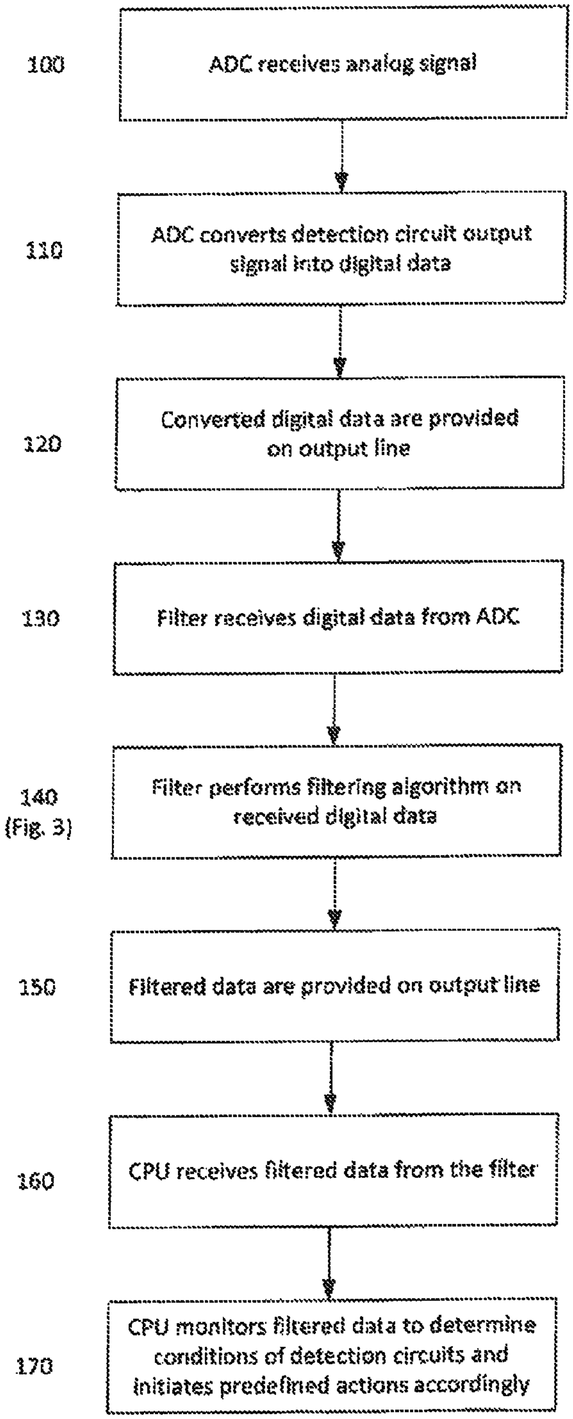
FIG. 2 is a flow diagram illustrating a method of converting, filtering, and processing an electrical signal in accordance with an exemplary embodiment of the present disclosure.
Figure 3:
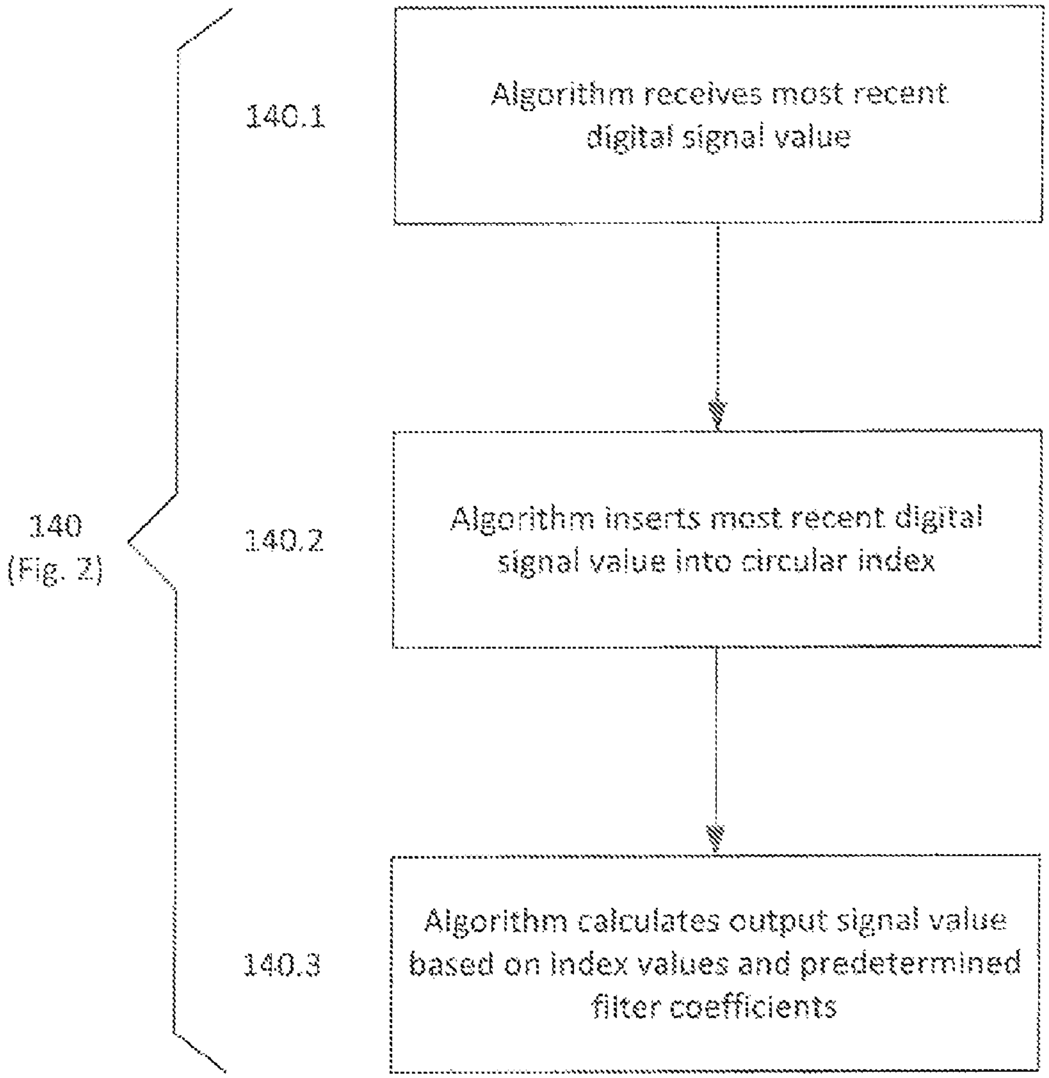
FIG. 3 is a flow diagram illustrating an exemplary embodiment of the filtering step shown in FIG. 2.

The flow diagram shown in FIG. 3 illustrates in greater detail the sequential software operations performed during execution of the above-described filtering algorithm (i.e. step 140 in FIG. 2). The following sequence of operations is separately performed on each of the detection circuit signals in the alarm system 10. At a first step 140.1 of the diagram in FIG. 3, the algorithm receives the most recent digital signal value x (e.g. a 12-bit integer) provided by the ADC 30 for a particular detection circuit signal. At step 140.2, the most recent signal value x[n] is inserted into a corresponding position in a circular index that maintains a predetermined number of most recent signal values, wherein the predetermined number of most recent signal values is equal to the number of taps of the filter (described above). At step 140.3, the algorithm calculates an output value y[n] according to the above-provided equation:

$$y[n] = \sum_{i=0}^{N} b_i x[n-i]$$

where $b_i$ are the predetermined filter coefficients (given by the coefficient formula above) and N is the filter order. This algorithm (i.e. steps 140.1-140.3 in FIG. 3) is continuously performed on the digital signal data provided by the ADC, thereby providing a continuous stream of filtered output data for each of the detection circuits in the alarm system. Particularly, the filtering algorithm effectively removes variations in the signal data that may be attributable to signal noise associated with a predefined range of frequencies (e.g. greater than 55 Hz).

Referring back to the flow diagram shown in FIG. 2, the stream of filtered signal data produced by the filter 34 may be provided on the data output line 36 at step 150. The filtered data may then be received as input data by the CPU 38 at step 160. At step 170, the CPU 38 may monitor the received input data to determine the operational state of each of the detection circuits 22-28 in the alarm system 10 and may initiate predefined actions accordingly. For example, if signal data corresponding to a particular detection circuit in the alarm system 10 indicates an alarm condition for longer than a predetermined response time of the circuit, the CPU 38 may determine that an alarm condition exists and may initiate certain actions, such as activating notification appliances, notifying a security service provider, and/or notifying police or fire departments. Because the filter 24 substantially removes noise components from the signal data more quickly than the response times of the detection circuits 22-28, occurrences of false alarms and other inaccurate determinations of the states of the detection circuits 22-28 are eliminated or at least mitigated.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The various embodiments or components described above, for example, the filter, CPU, and the components or processors therein, may be implemented as part of one or more computer systems, which may be separate from or integrated within the fire control panel 20. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISCs), application specific integrated circuits (ASICs), logic circuits, and any other circuit or processor capable of executing the functions described herein. The above examples are exemplary only, and are thus not intended to limit in any way the definition and/or meaning of the term "computer."

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

The invention claimed is:

1. A method for removing noise from a detection circuit output signal in an alarm system using a software filter, the method comprising:

converting the detection circuit output signal into a digital signal, wherein the digital signal includes a series of sampled values;

entering a most recent of the sampled values into a circular index containing a number of previously sampled values;

multiplying each of the values in the circular index by a predetermined filter coefficient; and summing products of each of the multiplied circular index values and filter coefficients to output a filtered digital signal value;

wherein the multiplying and summing steps are performed in accordance with the equation:

$$y[n] = \sum_{i=0}^{N} b_i x[n-i]$$

where y[n] is the filtered digital signal value, x[n] is the most recent of the sampled values, $b_i$ are the predetermined filter coefficients, and N is a length of the filter.

2. The method in accordance with claim 1, wherein the filter coefficients are calculated according to the formula:

$$b_i = \begin{cases} \dfrac{\sin[(i-\tau)\Omega_c]}{(i-\tau)\pi}, & \text{for } i \neq \tau \\ \Omega_c/\pi, & \text{for } i = \tau \end{cases}$$

$$i = 0, 1, \ldots, 2M$$

where $b_i$ are the filter coefficients, $\tau$ is a number of taps of the software filter, M is equal to $\tau$ if the filter coefficients are symmetric, and $\Omega_c=(\omega_{stop}+\omega_{pass})/(2\times f_s)$, where $\omega_{stop}$ is a stopband lower frequency of the software filter, $\omega_{pass}$ is a passband upper frequency of the software filter, and $f_s$ is a sampling frequency of the sampled values.

3. The method in accordance with claim 2, wherein $\omega_{stop}$ is in a range of 40 Hz to 60 Hz.

4. The method in accordance with claim 1, wherein the noise is line frequency noise.

5. The method in accordance with claim 1, wherein the noise is AC induction noise.

6. An alarm system comprising: at least one detection circuit;

an ADC operatively connected to the at least one detection circuit and configured to convert a detection circuit output signal in the at least one detection circuit into a digital signal;

a software filter operatively connected to the ADC and configured to receive the converted digital signal and to filter noise associated with a predetermined frequency range from the digital signal; and a CPU operatively connected to the software filter and configured to receive the filtered signal and to identify an operational state of the at least one detection circuit based on the filtered signal;

wherein the software filter is configured to:

receive a serious of sampled values from the ADC;

enter a most recent of the sampled values into a circular index containing a number of previously sampled values;

multiply the values in the circular index by predetermined filter coefficients; and sum products of each of the multiplied circular index values and filter coefficients to arrive at a filtered digital signal value;

wherein the multiplying and summing are performed in accordance with the equation:

$$y[n] = \sum_{i=0}^{N} b_i x[n-i]$$

where y[n] is the filtered digital signal value, x[n] is the most recent of the sampled values, $b_i$ are the predetermined filter coefficients, and N is a length of the filter.

7. The alarm system in accordance with claim 6, wherein the detection circuit comprises at least one sensor located in a zone of a monitored structure.

8. The alarm system in accordance with claim 6, wherein the noise is line frequency noise.

9. The alarm system in accordance with claim 6, wherein the noise is AC induction noise.

10. The method in accordance with claim 6, wherein the predetermined frequency range is 40 Hz to 60 Hz.

11. The alarm system in accordance with claim 6, wherein the ADC is configured to convert the detection circuit output signal into a stream of integers at a predefined sampling rate.

12. The alarm system in accordance with claim 11, wherein the filter coefficients are calculated according to the formula:

$$b_i = \begin{cases} \frac{\sin[(i-\tau)\Omega_c]}{(i-\tau)\pi}, & \text{for } i \neq \tau \\ \Omega_c/\pi, & \text{for } i = \tau \end{cases}$$

$$i = 0, 1, \ldots, 2M$$

where $b_i$ are the filter coefficients, $\tau$ is a number of taps of the software filter, M is equal to $\tau$ if the filter coefficients are symmetric, and $\Omega_c=(\omega_{stop}+\omega_{pass})/(2\times f_s)$, where $\omega_{stop}$ is a stopband lower frequency of the software filter, $\omega_{pass}$ is a passband upper frequency of the software filter, and $f_s$ is a sampling frequency of the sampled values.

13. The alarm system in accordance with claim 12, wherein $\omega_{stop}$ is in a range of 40 Hz to 60 Hz.

14. The alarm system in accordance with claim 6, wherein the CPU is configured to initiate one or more actions based on the identified operational state of the at least one detection circuit.

* * * * *